May 4, 1965
H. GOLDSCHMIDT ETAL
3,181,252
TEACHING DEVICE (TUTOR TOY)
Filed Dec. 17, 1962
2 Sheets-Sheet 1
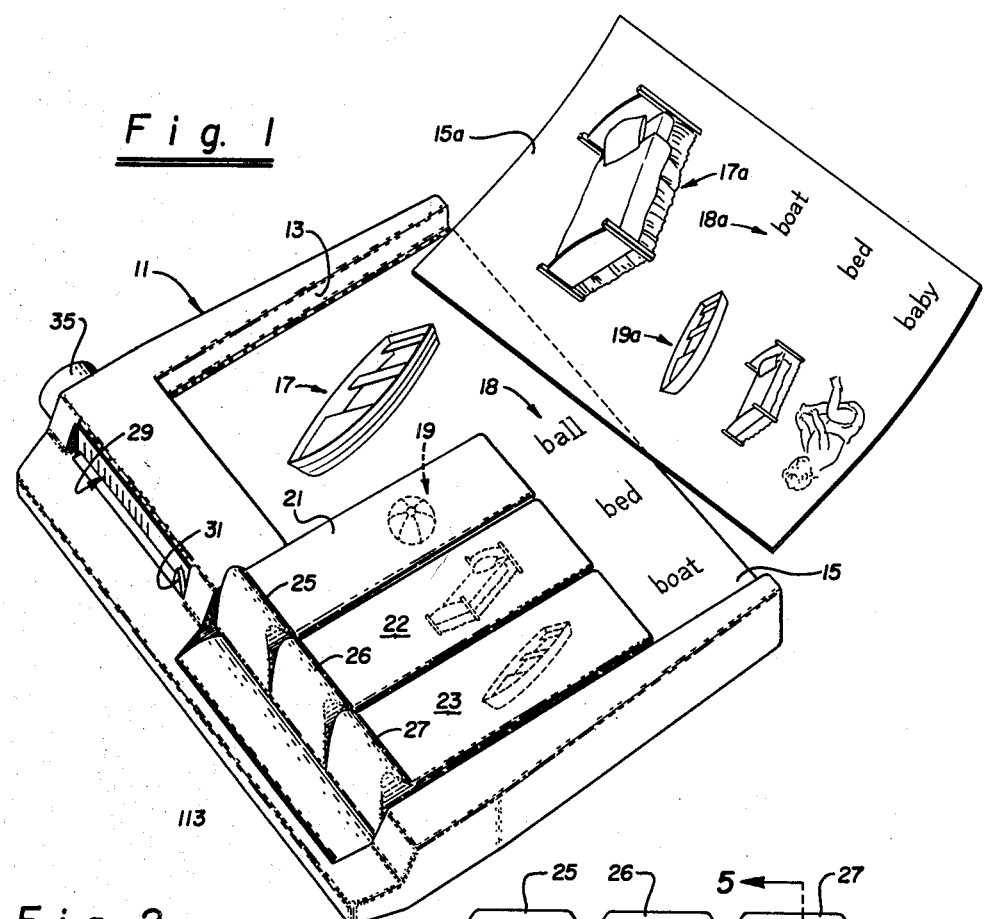
Fig. 1
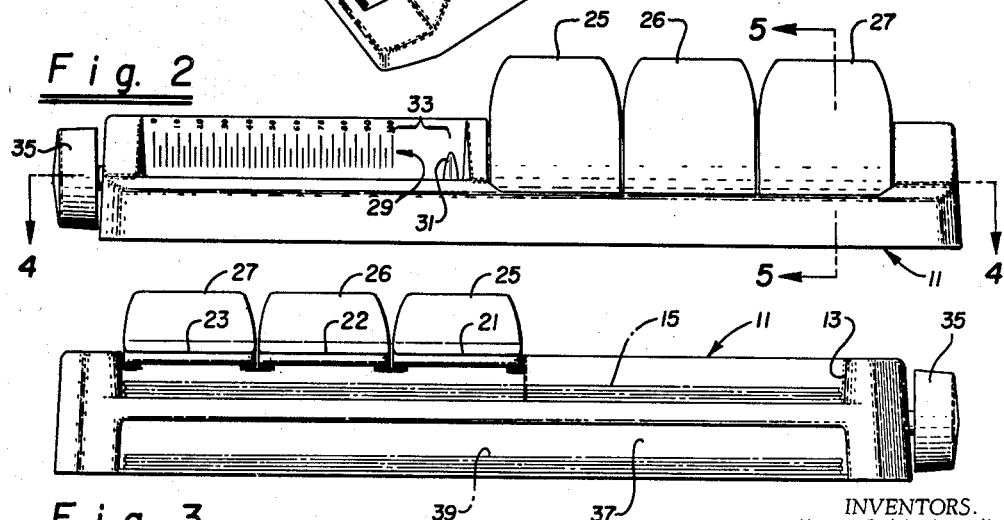
Fig. 2
Fig. 3
INVENTORS.
Hans Goldschmidt
Adrian B. Sanford
BY
Attorneys.

May 4, 1965 H. GOLDSCHMIDT ETAL 3,181,252
TEACHING DEVICE (TUTOR TOY)
Filed Dec. 17, 1962 2 Sheets-Sheet 2
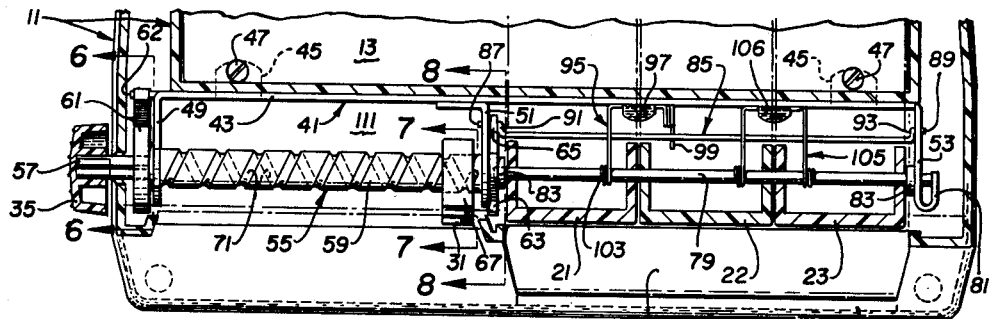
Fig. 4
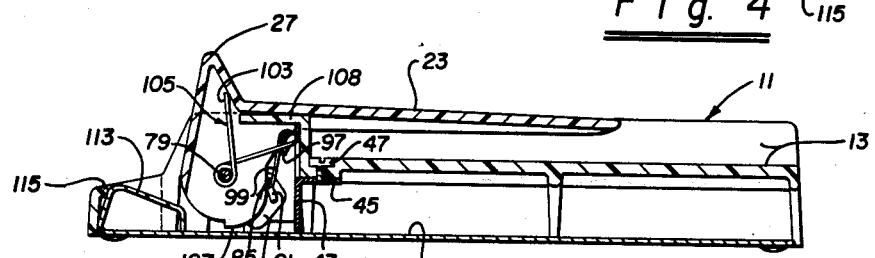
Fig. 5
Fig. 6
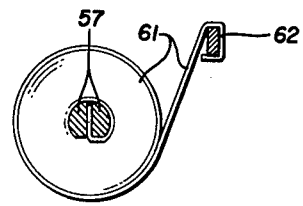
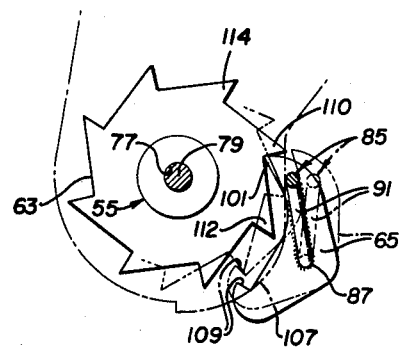
Fig. 8
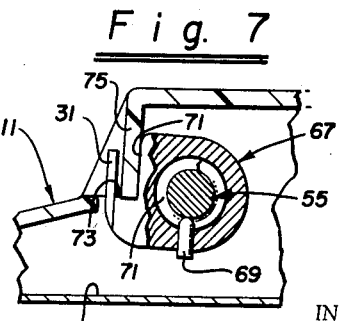
Fig. 7
INVENTORS.
Hans Goldschmidt
Adrian B. Sanford
BY
Attorneys.

United States Patent Office 3,181,252
Patented May 4, 1965

3,181,252
TEACHING DEVICE (TUTOR TOY)
Hans Goldschmidt, Atherton, and Adrian B. Sanford, Portola Valley, Calif., assignors to H. Goldschmidt & Associates, Inc., Menlo Park, Calif., a corporation of California
Filed Dec. 17, 1962, Ser. No. 245,185
5 Claims. (Cl. 35—9)

This invention relates to a device for teaching, or more particularly to a teaching device which may be employed as a game and further in which multiple choice answers to a single question are employed.

There have, in the past, been a number of teaching devices in which questions are presented and a student attempts to find the correct one of multiple choice answers by marking his choice and subsequently looking to an answer sheet to determine if his choice has been correct. Such teaching methods have several inherent difficulties. The primary difficulty is that the correct answer is completely disassociated from the answer selected by the student, thus the student does not receive the full benefit of his learning facilities.

Another difficulty with this type of teaching method is that the student, if he chooses the wrong answer, does not fully realize why his answer is wrong but only that his answer is wrong and what his answer should have been.

It is, therefore, a general object of this invention to provide an improved teaching device.

It is another object of this invention to provide a teaching device wherein multiple choice answers are provided.

It is another object of this invention to provide a teaching device of the aforementioned characteristics wherein the student is provided, when he selects the wrong answer, the reason that his answer is wrong.

Another object of this invention is to provide a teaching device of the aforementioned character wherein the correct answer as well as the reasons that the incorrect answers are incorrect is closely associated with the answer selected by the student.

It is another object of this invention to provide a teaching device of the aforementioned character and which is further provided with a scoring device whereby the student's score, for a particular number of questions may be easily determined.

The above and further objects of the invention will become more clearly apparent upon a review of the following description in conjunction with the accompanying drawing, in which:

FIGURE 1 is a perspective view of a teaching device in accordance with one embodiment of this invention showing one question sheet in place and another sheet in the process of being removed;

FIGURE 2 is a side view of a teaching device shown in FIGURE 1 taken from the left hand side thereof;

FIGURE 3 is a side view of the teaching device shown in FIGURE 1 taken from the right hand side;

FIGURE 4 is a partial sectional view of the embodiment shown in FIGURE 1 taken along the line 4—4 of FIGURE 2;

FIGURE 5 is a sectional view taken along the line 5—5 of FIGURE 2;

FIGURE 6 is a sectional view taken along the line 6—6 of FIGURE 4;

FIGURE 7 is a sectional view taken along the lines 7—7 of FIGURE 4; and

FIGURE 8 is a sectional view taken along the line 8—8 of FIGURE 1.

Referring to FIGURES 1, 2 and 3 the overall configuration and the general utility of the teaching device can be seen. The device includes a housing 11 having a recess 13 thereon for receiving question and answer cards 15. The housing 11 may be made of a plastic material or the like. As can be seen particularly in FIGURE 1 the cards may be inserted or removed as shown with respect to the card 15a. The card 15a bears the same reference numerals as the card 15 but with the inclusion of the suffix "a." Each of the cards generally includes a question area 17a, which may be in the form of a picture as shown on the card 15a, and a multiple choice answer area 18a which in this case includes a list of words "boat," "bed," and "baby." The card also includes a second column 19a which may be designated as the "correct answer" column and shows a student whether or not his selected answer is correct and if not correct, why.

In actual use the card is located as shown with respect to the card 15 whereby a plurality of covers 21, 22 and 23 are located to cover the column 19. Thus, in normal use the student merely sees the question area 17 and the multiple choice answers 18.

Upon selecting what he considers the proper answer the student lifts the associated cover 21, 22 or 23 by means of its upstanding portions 25, 26 or 27. If the student has selected the proper one of the multiple choice answers the picture revealed below the selected cover 21, 22 or 23 will be the same as that shown in the question area 17.

If, however, the student selects a wrong one of the multiple choice answers the picture shown below the selected cover will be different from that shown in the question area 17. The picture shown upon selection of the wrong multiple choice answer will be the correct answer for that selected word. Thus, with respect to the card 15, if the student wrongly selects the word "bed" instead of the proper word "boat" a picture of a bed will be shown upon lifting the cover 21. Thus the student not only realizes that he has selected the wrong answer but he is also able to associate the word "bed" with its proper visual image. He then realizes first that b-e-d does not spell "boat" and second he realizes that b-e-d does spell "bed."

With such an operation the student is not so much obsessed with the problem of getting a correct answer but he is continually learning even when he selects the wrong answer.

In addition, scoring means are employed with respect to the teaching device whereby the student's total score after a series of quizzes may be revealed. The scoring device includes a scale 29 with an associated traveling pointer 31. The mechanical operation of the pointer 31 will be described in detail hereinafter. In operating principle, if it is assumed that a particular quiz includes twenty cards 15, and if the student answers each question correctly there will be a total of twenty lifts of the various covers in order to verify each correct answer.

If the student selects, during the course of the quiz, one or more wrong answers he will continue to lift the covers with the same card in position until he selects the correct answer. Thus, for instance, with respect to the card 15a if the child first selects the word "boat" to be the proper answer there will be a first lift of a cover. If he subsequently selects the word "baby" there will be a second lift of the cover and finally when he selects the correct word "bed" there will be a third lift of the cover to reveal the proper answer. Thus, with a total of twenty cards there will be a maximum of sixty lifts of the covers and on the other hand, if he selects the proper answer in each instance, on the first try there will be a total of twenty lifts of the covers. Consequently, twenty lifts of the cover may be considered a perfect score of one-hundred percent and sixty lifts as a zero percent score. The pointer 31, then, is arranged to move twenty discrete increments (one for each lift of the cover)

along the area 33 (FIGURE 2) at the end of which the pointer will register with the one hundred percent mark on the scale 29. For each additional lift of the cover the pointer 31 moves an additional step to the left as shown in FIGURE 2 along the scale 29. Thereby after the total of twenty cards have been used and analyzed by a student his individual score may be read on the scale 29. In using as an example, twenty cards each having one correct answer and two incorrect answers there will be space in the area 33 for twenty movements of the pointer 31 and along the scale 29 there will be space for forty individual movements of the pointer 31. The number of cards and the number of multiple choice answers can easily be altered.

In order to reset the pointer 31 to the position shown in FIGURE 2 a knob 35 is employed. The mechanical operation of the knob 35 will be described hereinafter.

Also in the housing 11 there is included a recess 37 which may be used to store additional question cards 39.

Referring to FIGURES 4 through 8 the mechanical operation of one embodiment of scoring device in accordance with this invention is shown. The scoring device comprises the mechanism assembly shown in FIGURE 4 which includes a mounting bracket 41 having an upstanding wall portion 43 with outwardly extending ears 45. The assembly is secured to the housing 11 by means of screws 47 associated with the ears 45.

The bracket also includes right angle extensions 49, 51 and 53. A shaft 55 is rotatably mounted on the extensions 49 and 51 and includes a shank portion 57 and a larger diameter helically grooved portion 59. An opening in the extension 49 is sufficient to rotatably receive the shank 57 but the end of the helically grooved portion 59 serves as a shoulder against the extension 49 whereby the axial movement of the shaft 55 is limited.

As can be seen more clearly in FIGURE 6, the shank 57 serves as an anchor for one end of a spiral wound spring 61. The other end of the spring is anchored to the bracket 41 as at 62. In addition, the knob 35 is secured to the end of the shank 57. When the knob 35 is rotated to return the pointer 31 to its position as shown in FIGURE 2 the spring 61 is wound placing rotary tension on the shaft 55.

In order to prevent free rotation of the shaft 55 under the influence of spring 61, a ratchet wheel 63 is secured on that portion of the shaft 55 which extends through the extension 51. As can be seen particularly in FIGURE 8 the ratchet wheel 63 is associated with a ratchet pawl 65 to form an escapement mechanism as will be explained hereinafter.

Referring to FIGURES 4 and 7, the pointer 31 is secured to a collar 67 which includes a detent or set screw 69 for cooperation with the helical groove 71 on the shaft 55. Rotation of the collar 67 with the shaft 55 is prevented by means of shoulders 71 and 73 on the collar contacting a downward extension 75 of the housing 11. Thus, upon rotation of the shaft 55 the pointer 31 is moved axially on the shaft by the cooperation of the helical groove 71 and the set screw 69.

The right hand end (as shown in FIGURE 4) of the shaft 55 includes a central recess 77 (FIGURE 8) which receives a shaft 79. The shaft 79 extends from the shaft 55 through an opening in the extension 53 and is retained in that position by means of a bent tab 81 which is merely an ear on the extension 53.

The shaft 79 serves as a pivot point for each of the covers 21, 22 and 23 which are rotatably mounted thereon and are centrally retained by means of the washers 83.

A trip bar 85 is eccentrically pivoted between the extensions 51 and 53 by means of the pivot points 87 and 89 and their respective extensions 91 and 93. Pawl 65 is rigidly secured to the extension 91 in the position shown in FIGURE 8.

A spring 95 is secured to the upright member 43 by means of a tab 97 thereon. One end 99 of the spring extends downward from the tab 97 (FIGURES 4 and 5) and resiliently urges the trip bar 85 to the left as shown in FIGURE 5. This position of the trip bar is shown in FIGURE 8 by solid lines, whereby the upper edge 101 of the pawl 65 engages the teeth of the ratchet wheel 63. Consequently, with the operation of the spring 95, rotation of the shaft 55 under the influence of the spring 61 is prevented.

The other end 103 of the spring 95 extends about the shaft 79 upward into engagement with the upright 25 of the cover 21, whereby the cover 21 is resiliently urged in its downward position as shown in FIGURE 5. An additional spring 105 is similarly secured to the upright member 43 by a tab 106 and has its ends extending about the shaft 79 and in engagement with the upright members 26 and 27 of the covers 22 and 23 respectively. Consequently, each of the covers 21, 22 and 23 is resiliently urged towards its down position against a stop 108 on the housing 11.

As can be seen more clearly in FIGURE 5 each of the covers 21, 22 and 23 includes a cam portion 107 which cooperates with the trip bar 85. Thus, upon raising either one of the covers 21, 22 or 23, its respective cam surface 107 urges the trip bar in clockwise direction about its pivots 87 and 89 as viewed in FIGURES 5 and 8. Thus, the pawl 65 is urged to the position shown in broken lines in FIGURE 8. Thus, the tooth 110 is freed and the ratchet wheel 63 and its attached shaft 55 is permitted to rotate in a clockwise direction as shown in FIGURE 8. However, with this position of the pawl 65 its lower edge 109 is placed in the path of the next adjacent ratchet tooth 112 to prevent continuous rotation. When the particular cover 21, 22 or 23 is released, the trip bar 85 is again permitted to assume the position shown by solid lines in FIGURE 8 and the ratchet wheel 63 continues rotation until the next tooth 114 engages the upper edge 101 of the pawl 65.

In this manner then, the shaft 55 is rotated and the pointer 31 is axially traveled along the shaft to indicate the scoring. Thus, it is seen that the ratchet wheel 63 and the pawl 65 act together as an escapement whereby the shaft 55 is incrementally rotated under the influence of the spring 61 in order to move pointer 31 across the scoring area 29.

As can be seen more clearly in FIGURE 5, the bottom of the teaching device employs a plate 111 having a raised shoulder 113 along the area adjacent the upright members 25, 26 and 27. The shoulder 113 serves as a stop or limit for the raised portions 25, 26 and 27 as the covers are lifted to prevent breakage of the housing portion 115 in the event that the covers are roughly handled.

Although the teaching device has been described with cards which are arranged for reading instructions, it is apparent that the cards may equally well be arranged for various other instructional purposes such as for instance, the teaching of languages, history, geography, and arithmetic.

Thus, it is seen that an improved teaching device has been described which accommodates cards having a question area and multiple choice answers. Means are provided for choosing either of the multiple choice answers in such a manner that the student is advised first whether his answer is correct and second, if incorrect, why. In all cases the question and various answers are closely associated whereby the students learning facilities are employed to the maximum degree. Furthermore, there has been described a teaching device wherein the art of selecting various ones of multiple choice answers serves to activate a scoring device. Although a particular scoring device was described as a preferred embodiment, it is apparent that other such devices may be employed within the scope of the invention.

In addition, a simplified embodiment of the device may completely eliminate the scoring device and its features. While the simplified device clearly will not be as advantageous as that including the scoring device, simplification will clearly make a less expensive device which may be the subject of wider distribution.

We claim:
1. A teaching device comprising a housing having thereon means to receive a card of the type having a question area, a multiple choice answer area, and a correct answer area subdivided into correct and incorrect answer portions thereof, a plurality of raisable leaf-like cover members normally masking from view an associated one of said answer portions and manually pivotable individually about a common axis adjacent said housing to reveal one of said associated portions, whereby the correct answer for an associated multiple choice answer is revealed, a scoring device, said scoring device comprising a scoring indicator, a scoring scale associated with said indicator, means operable in response to a predetermined degree of pivotal movement of said cover members serving to advance said scoring indicator one increment of displacement on said scoring scale to register each raising of any of said cover members.

2. A teaching device comprising a housing having thereon means to receive a card of the type having a question area, a multiple choice answer area and a correct answer area, a plurality of covers pivotably mounted adjacent said housing for selectively covering associated portions of said correct answer area, a tab portion fixed to each cover for selectively pivoting individual ones of said covers away from said correct answer area, scoring means including traveling score indicating means, resilient means coupled to the indicating means for causing the same to travel, escapement means for periodically arresting the travel of said indicating means, and means responsive to the pivoting of said individual ones of the covers for operating said escapement whereby upon successive pivoting movement of any of said covers the scoring means travels incrementally.

3. A teaching device comprising a housing having thereon means to receive a card of the type having a question area, a multiple choice answer area and a correct answer area, a plurality of covers individually pivoted adjacent said housing whereby individual portions of said correct answer area may be revealed while other portions thereof remain hidden, a helically grooved shaft, a collar on said shaft having a detent cooperating with the helical groove of said shaft, indicating means joined to said collar, means cooperating with said collar for preventing rotation thereof about the axis of the shaft, resilient means connected to said shaft for urging rotation thereof, escapement means coupled to said shaft for arresting the rotation thereof, and means for operating said escapement, said last named means being responsive to pivoting movement of any of said covers.

4. A teaching device as defined in claim 3 wherein said indicating means comprises a pointer, and scale means cooperating with said pointer whereby scoring is indicated.

5. A teaching device comprising a housing having thereon means to receive a card of the type having a question area, a multiple choice answer area and a correct answer area, a plurality of covers individually pivoted adjacent said housing whereby individual portions of said correct answer area may be revealed while other portions thereof remain hidden, a pawl, means operable in response to a predetermined degree of pivoting movement of any of said covers for moving said pawl from a first to a second position, a moveable scoring indicator, means for resiliently urging said scoring indicator in one direction, said pawl in its first position being coupled to said scoring indicator whereby movement of the indicator is prevented, said pawl in its second position being at least partially free of said scoring indicator whereby limited incremental movement of the indicator is permitted.

References Cited by the Examiner
UNITED STATES PATENTS

| | | | |
|---|---|---|---|
| 144,861 | 11/73 | Payne | 235—107 |
| 2,911,741 | 11/59 | Boyer | 35—9 |
| 2,983,054 | 5/61 | Twyford | 35—9 |
| 3,095,654 | 7/63 | Cummings | 35—9 |
| 3,110,499 | 11/63 | Boeskool | 35—9 |
| 3,116,564 | 1/64 | Sanford | 35—9 |

JEROME SCHNALL, *Primary Examiner.*

GEORGE NINAS, Jr., LAWRENCE CHARLES,
*Examiners.*